United States Patent
Venkatesh et al.

(10) Patent No.: US 7,956,724 B2
(45) Date of Patent: Jun. 7, 2011

(54) SUPPORT FOR RELIABLE END TO END MESSAGING OF TAGS IN AN RFID INFRASTRUCTURE

(75) Inventors: Ramachandran Venkatesh, Hyberabad (IN); Abhishek Agarwal, Hyberabad (IN); Anush Kumar, Seattle, WA (US); Balasubramanian Sriram, Sammamish, WA (US); Mohamed Fakrudeen Ali Ahmed, Coimbatore (IN); Janaki Ram Goteti, Hyderabad (IN); Jayaraman Kalyana Sundaram, Hyderbad (IN); Kalyan Chakravarthy Sonnathi, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1233 days.

(21) Appl. No.: 11/460,772

(22) Filed: Jul. 28, 2006

(65) Prior Publication Data

US 2008/0001709 A1  Jan. 3, 2008

(30) Foreign Application Priority Data

Jun. 15, 2006 (IN) .......................... 1423/DEL/2006

(51) Int. Cl.
*H04Q 5/22* (2006.01)

(52) U.S. Cl. .................. 340/10.1; 340/572.1; 709/201; 709/250; 709/249; 235/376

(58) Field of Classification Search ............... 340/10.1, 340/572.1
See application file for complete search history.

(56) References Cited

U.S. PATENT DOCUMENTS

| | | |
|---|---|---|
| 5,650,768 A | 7/1997 | Eswaran |
| 5,910,776 A | 6/1999 | Black |
| 6,405,261 B1 | 6/2002 | Gaucher |
| 6,631,363 B1 | 10/2003 | Brown et al. |
| 6,677,852 B1 | 1/2004 | Landt |
| 6,732,923 B2 | 5/2004 | Otto |
| 6,784,802 B1 | 8/2004 | Stanescu |
| 6,859,831 B1 * | 2/2005 | Gelvin et al. ............ 709/224 |
| 6,908,034 B2 | 6/2005 | Alleshouse |
| 6,943,683 B2 | 9/2005 | Perret |
| 7,155,305 B2 | 12/2006 | Hayes et al. |
| 7,204,409 B2 | 4/2007 | Kumar et al. |
| 7,267,275 B2 | 9/2007 | Cox et al. |
| 2002/0059471 A1 | 5/2002 | Savghvi et al. |
| 2002/0070865 A1 | 6/2002 | Kenneth et al. |
| 2002/0103819 A1 * | 8/2002 | Duvillier et al. ......... 707/206 |

(Continued)

FOREIGN PATENT DOCUMENTS

EP  11632893  3/2006

(Continued)

OTHER PUBLICATIONS

European Search Report dated Feb. 6, 2006, mailed Feb. 6, 2006 for EP Appln. Serial No. 05107826, 7 pages.

(Continued)

*Primary Examiner* — Brian A Zimmerman
*Assistant Examiner* — Omer S Khan
(74) *Attorney, Agent, or Firm* — Turocy & Watson, LLP

(57) ABSTRACT

The claimed subject matter provides a system and/or a method that facilitates ensuring reliable data within a radio frequency identification (RFID) infrastructure. A radio frequency identification (RFID) network can include at least one device that receives data from a tag. A distribute component can initiate a reliable transaction with the received data to ensure at least one subscribing RFID process utilizes such data.

15 Claims, 11 Drawing Sheets

U.S. PATENT DOCUMENTS

| | | | |
|---|---|---|---|
| 2002/0170952 A1 | 11/2002 | Alsafadi et al. | |
| 2003/0135576 A1 | 7/2003 | Bodin | |
| 2003/0144926 A1 | 7/2003 | Bodin et al. | |
| 2003/0225928 A1 | 12/2003 | Paul | |
| 2003/0227392 A1 | 12/2003 | Ebert et al. | |
| 2004/0046642 A1 | 3/2004 | Becker et al. | |
| 2004/0070491 A1 | 4/2004 | Huang et al. | |
| 2004/0111335 A1 | 6/2004 | Black et al. | |
| 2004/0193641 A1 | 9/2004 | Lin | |
| 2004/0215667 A1 | 10/2004 | Taylor et al. | |
| 2005/0062603 A1 | 3/2005 | Fuerst et al. | |
| 2005/0088420 A1* | 4/2005 | Dodge et al. | 345/173 |
| 2005/0092825 A1 | 5/2005 | Cox et al. | |
| 2005/0150952 A1 | 7/2005 | Chung | |
| 2005/0150953 A1 | 7/2005 | Alleshouse | |
| 2005/0237194 A1 | 10/2005 | VoBa | |
| 2006/0026080 A1* | 2/2006 | Rodriguez et al. | 705/26 |
| 2006/0043165 A1 | 3/2006 | Kumar et al. | |
| 2006/0047464 A1 | 3/2006 | Kumar et al. | |
| 2006/0047545 A1 | 3/2006 | Kumar et al. | |
| 2006/0047646 A1 | 3/2006 | Maluf et al. | |
| 2006/0047787 A1 | 3/2006 | Agarwal et al. | |
| 2006/0047789 A1 | 3/2006 | Kumar et al. | |
| 2006/0053234 A1 | 3/2006 | Kumar et al. | |
| 2006/0055508 A1 | 3/2006 | Kumar et al. | |
| 2006/0058987 A1 | 3/2006 | Kumar et al. | |
| 2006/0075210 A1* | 4/2006 | Manohar et al. | 712/36 |
| 2006/0176169 A1* | 8/2006 | Doolin et al. | 340/521 |
| 2006/0202825 A1* | 9/2006 | Rajapakse et al. | 340/568.2 |
| 2007/0136278 A1* | 6/2007 | Grazioli et al. | 707/6 |

FOREIGN PATENT DOCUMENTS

| | | |
|---|---|---|
| WO | 03102845 | 12/2003 |
| WO | 2005078633 | 8/2005 |

OTHER PUBLICATIONS

European Search Report dated Oct. 4, 2005, mailed Apr. 11, 2006 for EP Appln. Serial No. 05108005, 9 pages.

European Search Report dated Oct. 2, 2005, mailed Feb. 10, 2006 for EP Appln. Serial No. 05107796, 6 pages.

IBM."alphaWorks: RFID Device Development Kit: Overview" http://www/alphaworks.ibm.com/tech/rfiddevice last viewed Nov. 7, 2005, 1 page.

Alien "ALR-9800 Enterprise RFID Reader" http://www.alientechnology.com/docs/AT_DS_9800v3_WEB.pdf last viewed Nov. 7, 2005, 4 pages.

Tsetsos, et al. "Commercial Wireless Sensor Networks: Technical and Business Issues" Proceedings of the Second Annual Conference on Wireless On-Demand Network Systems and Services (Jan. 19-21, 2005) 8 pages.

Branch, et al. "Sentire: A Framework for Building Middleware for Sensor and Actuator Networks" Proceedings of the Third International Conference on Pervasive Computing and Communications Workshops (Mar. 8, 2005) pp. 396-400.

Harrison, et al. "Information Management in the Product Lifecycle—the Role Networked RFID" Proceedings of the Second IEEE International Conference (Jun. 24, 2004) pp. 507-512.

Bornhovd, et al. "Integrating Smart Items with Business Processes An Experience Report" Proceedings of the Thirty-Eighth Hawaii International Conference on System Science (Jan. 3, 2005) 8 pages.

Ganesh, et al. "Web Services and Multi-Channel Integration: A Proposed Framework" Proceedings of the IEEE International Conference on Web Services (Jul. 6, 2004) 8 pages.

Ortiz. "An Introduction to Java Card Technology-Part1" http://developers.sun.com/techtopics/mobility/javacard/articles/javacard1/> last viewed Dec. 19, 2005, 14 pages.

Chen. "Understanding Java Card 2.0" URL:.com//javaworld/jw-03-javadev_p.html> last viewed Dec. 19, 2005, 12 pages.

Annonymous. "The Sun Global RFID Network Vision: Connecting Business at the Edge of Network" http://www.sun.com/software/solutions/rfid/Sun_RFIS_Vision_rla.pdf Jul. 2004.

European Search Report dated Mar. 9, 2006, mailed Mar. 27, 2006 for European Patent Application Serial No. EP05107794, 5 pages.

European Search Report dated Feb. 7, 2006, mailed Feb. 7, 2006 for European Patent Application Serial No. EP05108001, 7 pages.

European Search Report dated May 11, 2006, mailed May 12, 2006 for European Patent Application Serial No. EP05107744, 7 pages.

International Search Report dated and mailed Jul. 27, 2007 for PCT Application Serial No. PCT 2004/004005, 6 pages.

Floerkemier, et al. "PML Core Specification 1.0" Sep. 13, 2003, Auto-ID Center, Version 1.0, 48 pages.

\* cited by examiner

US 7,956,724 B2

SUPPORT FOR RELIABLE END TO END MESSAGING OF TAGS IN AN RFID INFRASTRUCTURE

CROSS REFERENCE TO RELATED APPLICATION(S)

This application claims the benefit of India Patent Application Serial No. 1423/DEL/2006 filed on Jun. 15, 2006, entitled "SUPPORT FOR RELIABLE END TO END MESSAGING OF TAGS IN AN RFID INFRASTRUCTURE." The entirety of which application is incorporated herein by reference.

BACKGROUND

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g. more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g. distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g. tag transceivers), tag writers, tag-programming stations, circulation readers, sorting equipment, tag inventory wands, etc. Such devices and, in general, RFID systems are exposed to security threats based solely on the characteristics which out-perform traditional and/or conventional systems. The RFID systems and devices are vulnerable and would be inept albeit for security measures associated therewith. With the growth of RFID systems, and in particular RFID devices, enhancing and improving security is an increasing concern to protect the quality, reliability, and integrity of such devices and systems.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate guaranteeing reliability of a tag read utilized in an RFID process. A distribute component can initiate a transaction between data and at least one RFID process that utilizes and/or executes with such data. The transaction can be employed upon transmission of the data from a tag to a device within an RFID network and the device transmits the data to a host. In other words, the transaction can begin after receipt of a tag read (e.g., after the device sends the tag read to the host). The transmitted data can be data received from the device, data communicated from the tag, a tag read, a tag read event, an event, a read, etc. The device that receives data from a tag within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. By creating a transaction upon transmission of the data, the RFID process can be ensured reliable data and be guaranteed to receive, utilize, execute, and/or pick up the data.

Once the transaction is initiated by the distribute component, the data associated with the transaction can be communicated to the RFID process that can pick up, execute, utilize, and/or run data. The RFID process can be related to a particular RFID sub-system (e.g., an RFID server, RFID network, etc.) that is an uber or high-level object that forms together various entities to create a meaningful unit of execution. The RFID process can be an outbound process (e.g., pick, pack, shipping scenario, etc.), a manufacturing process, a shipping process, a receiving process, tracking, data representation, data manipulation, data application, security, etc.

In accordance with one aspect of the claimed subject matter, the distribute component can utilize a queue to store any data transmitted from a tag to a device within an RFID network. The queue can store and/or hold onto such data after the data is transported to an RFID server and/or host. The queue can be a persistent queue that allows a respective subscribing RFID process to pick up related data. Moreover, the RFID process can utilize at least one of an event handler, a sink, a component, to use the data associated with the transaction.

In accordance with another aspect of the innovation described herein, the distribute component can include a rollback component. The rollback component can allow rolling the RFID process back to utilize data when an error and/or interruption occurs. An error and/or interruption can be, but is not limited to, a power outage, a reboot, an error, a corruption, a crash, a manual restart, a bug, a regression bug, etc. The rollback component can allow the RFID process to pick up where it left off in the case of the RFID process having an error and/or an interruption. When an error and/or interruption occurs, the execution of the data by RFID process can be incomplete. Yet, the RFID process can be placed back to a point before the error and/or interruption occurred by utilizing the rollback component. In other aspects of the claimed subject matter, methods are provided that facilitate guaranteeing reliability of a tag read utilized in a radio frequency identification (RFID) process.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
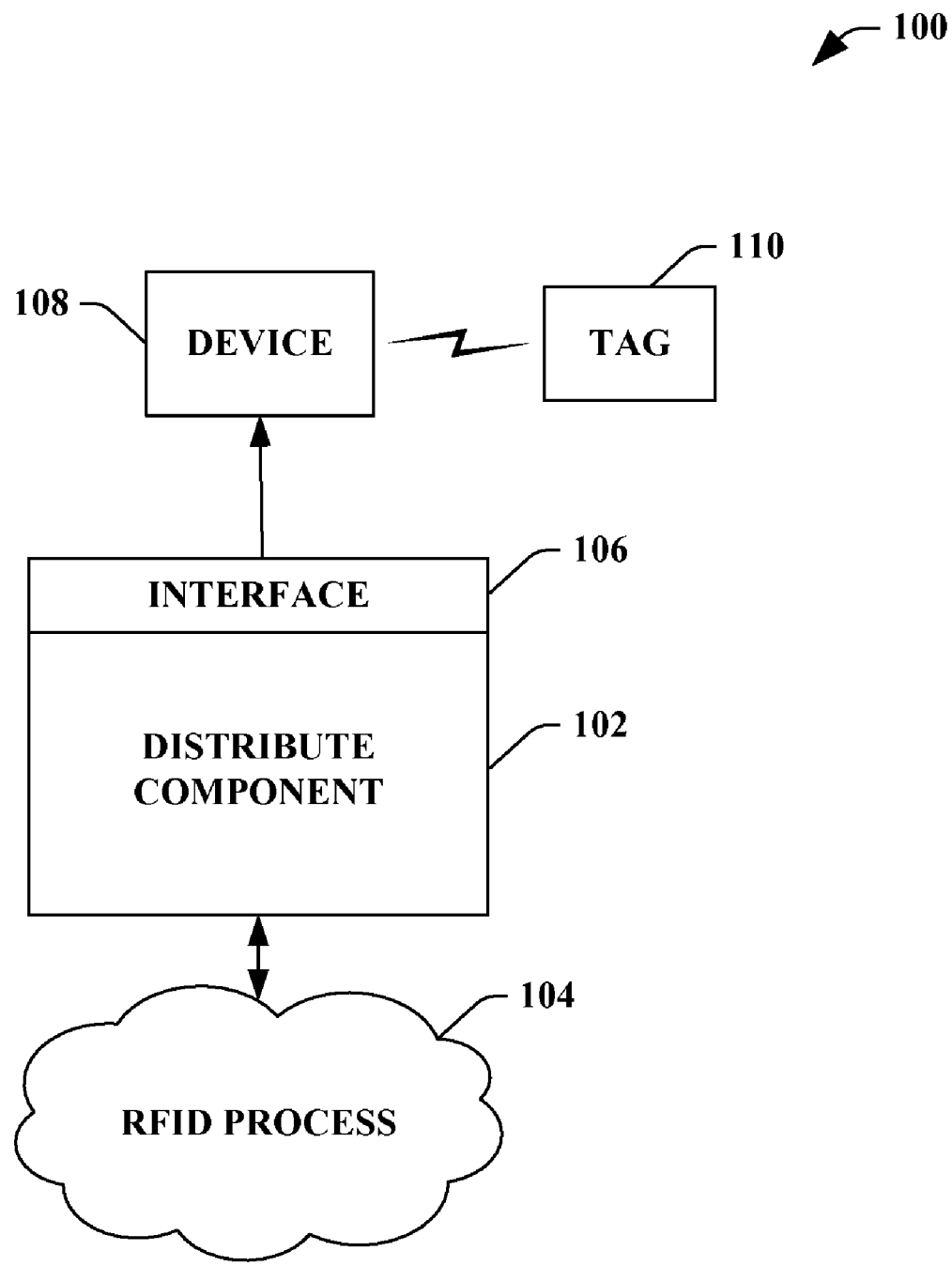
FIG. 1 illustrates a block diagram of an exemplary system that facilitates guaranteeing reliability of a tag read utilized in an RFID process.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "manager," "server," "host," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates guaranteeing reliability of a tag read utilized in an RFID process. The system 100 can include a distribute component 102 that establishes a reliable transaction with an RFID process 104 and data received by a device 108 from a tag 110 such that data integrity is ensured and/or protected. The data can be, for instance, any suitable data wirelessly transmitted from the tag 110 to the device 108, an event, a tag read event, etc. Moreover, the data can be utilized by the RFID process 104, wherein the RFID process 104 can safely execute the data involved in the transaction. The RFID process 104 can be a generic process that can be marketed and/or deployed to various enterprises (e.g., where there can be a plurality of enterprises, each enterprise having a distinct and/or unique device configuration, layout, and/or physical architecture). In other words, the distribute component 102 employs a reliable relationship with data from the device 108 to ensure the RFID process 104 can utilize such data without any concerns related to corruption, errors, accuracy of data, completeness of data, optimization of data, etc. Moreover, the RFID process 104 can allow any suitable component (e.g., event handler, sink, etc.) and/or entity to utilize such data. It is to be appreciated that the transaction can begin after receipt of a tag read (e.g., after the device sends the tag read to the host). In particular, the transactional relationship with the data can initiate upon entering into the host computing space.

For example, a first process within a host can utilize data from an RFID reader in a warehouse to provide shipping information. Once a tag is read from the RFID reader and received by the host, a transaction can be initiated to ensure reliable use of such data within the warehouse and/or with the first process. The transaction can be established upon communication of such data to the host and continue until the data is utilized by any and/or subscribing processes. Thus, if multiple processes utilized the data from the RFID reader, such transaction will continue until each and every process is complete with the received data. For instance, the data can be received and simultaneously relied upon employing the transaction, wherein the data can be held in a queue (discussed infra) until a process calls for such data. When the data is utilized by the subscribing processes, the data can be removed and/or deleted. This can ensure the data is reliable and/or utilized completely before removed.

The system 100 can further employ rollback techniques associated with any data participating in a transaction and/or transactional relationship. Thus, if a particular process has an error (e.g. crash, corrupt file, reboot, power outage, etc.), and a process did not utilize a portion of data (e.g. that is in a transactional relationship) based on the error, the system 100 can be "rolled back" to allow the process to utilize such data. Since the data is partaking in the transactional relationship, the data is stored and/or held onto until all subscribing processes utilize such data. Thus, if the data was not used by a process because of an error, typically such data is lost. Yet, by establishing a transaction with the data upon receipt, the data is not lost and the process can utilize such data as if the error never occurred.

It is to be appreciated that the RFID process 104 can utilize any suitable number of devices 108. An RFID process 104 can be related to a particular RFID sub-system (e.g., an RFID server, RFID network, etc.) that is an uber or high-level object that forms together various entities to create a meaningful unit of execution. The RFID process 104 can be and/or can include an outbound process (e.g., pick, pack, shipping scenario, etc.), a manufacturing process, a shipping process, a receiving process, tracking, data representation, data manipulation, data application, security, etc. Additionally, the RFID process 104 can include and/or respond to a device service, a tag read, an event, a tag write, a device configuration, a geographic tracking, a number count, etc. It is to be appreciated that the RFID process 104 can have raw data collected via at least one device, wherein such raw data can be manipulated based at least in part upon a rule and/or a business rule engine (not shown). The RFID process 104 can take a tag read event from the device 108 and make the tag read event available for at least one high level application.

For instance, the RFID process 104 can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the RFID process 104 can write to a tag process, wherein a tag can be written in real-time based at least upon an input. The write process can also check if the write succeeded by reading and passing data back to the host.

It is to be appreciated that the device 108 can receive a signal from, for instance, at least one tag 110 and/or a plurality of tags. In one example, the tag 110 can contain an antenna that provides reception and/or transmission to radio frequency queries from the device 108. Furthermore, it is to be appreciated that the device 108 within the RFID network (not shown) can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single device 108 and tag 110 are depicted, it is to be appreciated that a plurality of devices 108 and tags 110 can be utilized with the system 100.

Moreover, the system 100 can include any suitable and/or necessary interface component 106 (herein referred to as "interface 106"), which provides various adapters, connectors, channels, communication paths, etc. to integrate the distribute component 102 into virtually any operating and/or database system(s). In addition, the interface 106 can provide various adapters, connectors, channels, communication paths, etc., that provide for interaction with the distribute component 102, the device 108, the RFID process 104, and any other device and/or component associated with the system 100.

Figure 2:
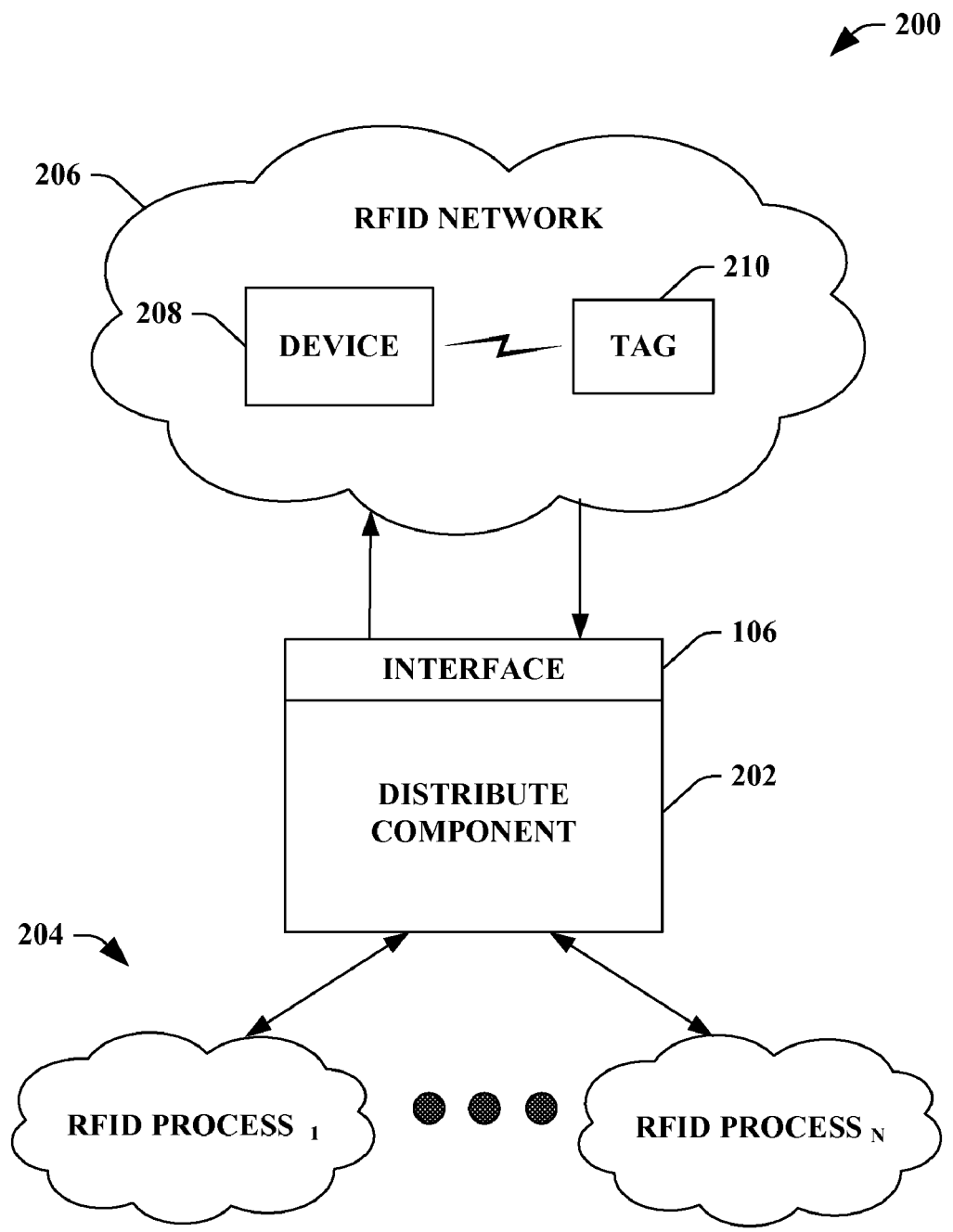
FIG. 2 illustrates a block diagram of an exemplary system that facilitates participating in a transaction related to data received via a device.

FIG. 2 illustrates a system 200 that facilitates participating in a transaction related to data received via a device. The system 200 can include a distribute component 202 that initiates a relationship with data and at least one RFID process 204. The data can be from a tag 210 communicated wirelessly to a device 208 within an RFID network 206. The relationship created with the data can be ensured to be reliable, wherein such reliability can be associated with establishing a transactional relationship. Furthermore, the relationship allows the system 200 to utilize the data completely and accurately so that data integrity and wholeness can be guaranteed. In other words, the distribute component 202 creates a transaction between data and at least one RFID process 204, wherein such transaction ensures the integrity of the data and allows all subscribing RFID processes 204 to utilize the data. It is to be appreciated that the distribute component 202, the RFID process 204, the device 208, the tag 210 can be substantially similar to components, processes, devices, and tags described in previous figures.

The distribute component 202 can enforce the following parameters to ensure reliable implementation of data: 1) atomicity; 2) consistency; 3) isolation; and 4) durability. The distribute component 202 can ensure that atomicity, consistency, isolation, and durability are invoked for data (e.g., a tag read, a read, a tag read event, an event) throughout the lifetime of the data (e.g., exhausted by subscribing processes and utilized thoroughly). It is to be appreciated that the four parameters can be referred to as "ACID."

The distribute component 202 can initiate a transactional relationship with data received (e.g. a read, a tag read, an event, a tag read event, etc.) and at least one RFID process 204. Additionally, the system 200 can include any number of RFID processes 204 such as RFID process $_1$ to RFID process $_M$, where M is a positive integer. Based on a tag read, a read, an event, a tag read event, etc., the distribute component 202 can guarantee reliable data based on creating a transaction. The data can be ensured upon initial receipt within the host associated with the RFID process 204 until each and every process subscribing thereto utilizes such data. For instance, if three processes subscribe to utilize a portion of data associated with a transaction, the data will not be removed from the system until all three processes completely exhaust the respective use of such data. Thus, any data that is in a transactional relationship can be maintained at receipt by a host associated with the RFID process 204 and ensured to be utilized by each subscribing RFID process 204 until exhausted.

The RFID network 206 can be implemented by any enterprise, business, facility, and/or any suitable entity that can utilize RFID technology. For instance, the RFID network 206 can be deployed to include any number of devices 208 such as device $_1$ to device $_N$, where N is positive integer. Moreover, such devices 208 can interact (e.g., wirelessly communicate) with any number of tags 210 such as tag $_1$ to tag $_M$, where M is a positive integer. It is to be appreciated that the devices 208 can be at least one of the following: an RFID reader, an RFID writer, an RFID printer, an RFID transmitter, a sensor, a real-time device, an RFID receiver, a real-time sensor, a device extensible to a web service, a real-time event generator, etc. In addition, the device 208 can be associated with at least an antenna to communicate data. Furthermore, it is to be appreciated that the tags 210 can be associated to any suitable object related to the enterprise, business, facility, and/or any suitable entity utilizing such RFID technology.

The devices 206 can be associated with at least one RFID process 204. It is to be appreciated that the RFID process 204 can run in the same host as the distribute component 202. The RFID network 206 can include various sub-systems and/or groups based at least in part upon device location, device functionality, device security level, process device association, make and/or model of device, type of device, device frequency, etc. For example, an RFID network 204 can include two groups and/or collections of devices, one at a shipping door and another at a receiving door. Such RFID network 206 can further include a process associated with each groups and/or collection of devices. For instance, the process can be a shipping process that is related to the devices at the shipping door, wherein the devices can collect data at such location. Similarly, another process can be a receiving process that is related to the devices at the receiving door, wherein the devices can collect data at such location.

Furthermore, the RFID process 204 can be a business process, wherein the devices 206 can be indirectly utilized in association with the business process (not shown). In an example, an RFID stack can bridge the gap between devices 208 and business applications. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time. In another example, an RFID host associated with the RFID network 206 can utilize a business rules engine (not shown), wherein such business rules engine can provide a rule-based system in association with any application related to the RFID network 206 such that a filter and/or alert can be utilized as a rule(s). The business rules engine can execute declarative filters and/or alerts as rules associated with an RFID network 206, wherein the rules can include a rule set adhered to an event, condition, and action format utilizing an extensible markup language (XML). The rule is at least one of the following: contained within a rule set that adheres to an event, a condition, and an action; and represented utilizing an extensible markup language (XML). Moreover, the condition has at least one of a set of predicates and a logical connective to form a logical expression that evaluates to one of a true and a false.

The process can be an uber and/or high-level object that can provide a meaningful unit of execution. For instance, the process can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the process can write to a tag process, wherein a tag can be written in real-time based at least upon an input. The write process can also check if the write succeeded by reading and passing data back to the host.

Figure 3:
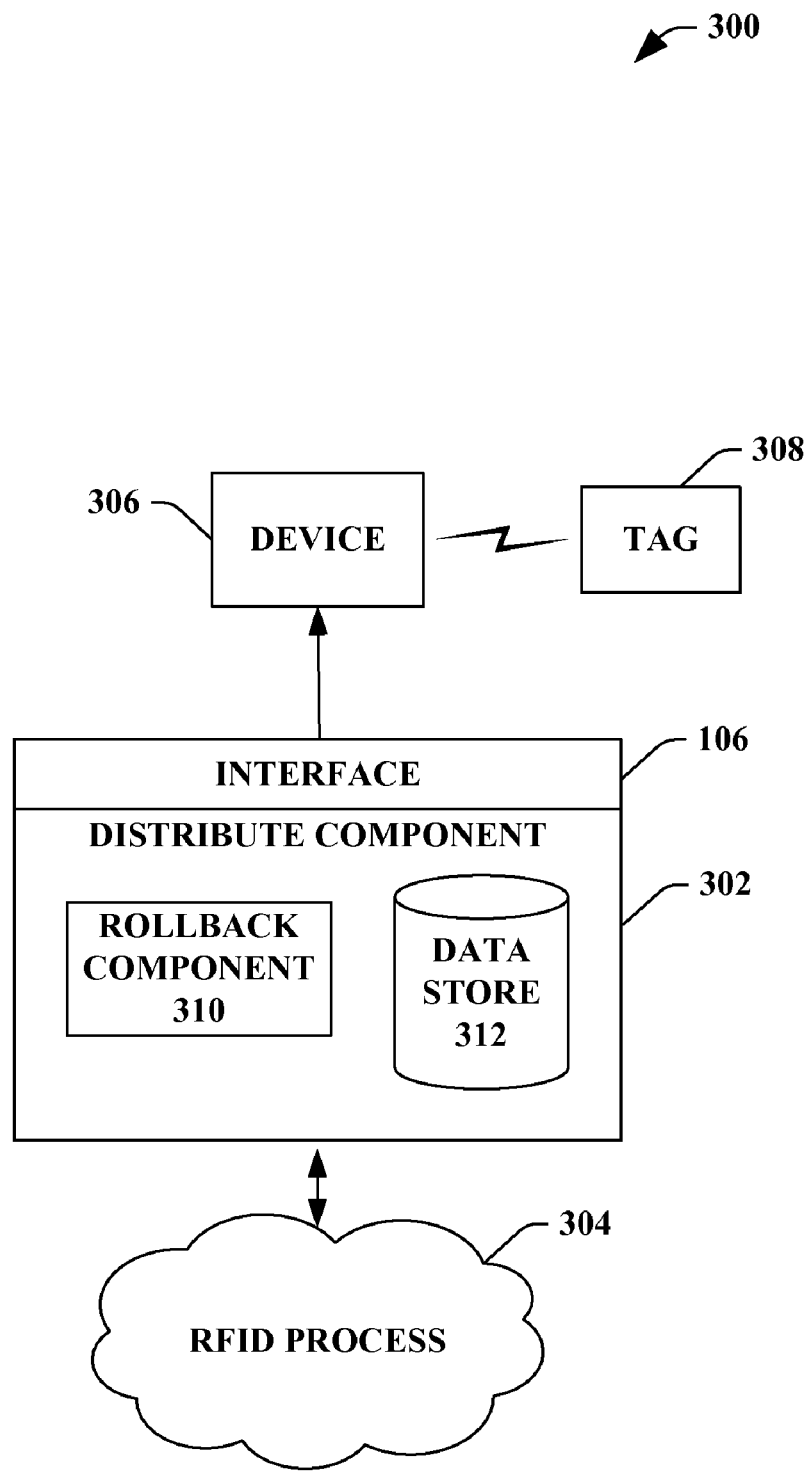
FIG. 3 illustrates a block diagram of an exemplary system that facilitates reducing data loss in relation to a device receiving tag data.

FIG. 3 illustrates a system 300 that facilitates reducing data loss in relation to a device receiving tag data. The system 300 can include a distribute component 302 that can establish a relationship with an RFID process 304 and at least one of a tag read, an event, a tag read event, a read, any data transmitted from a tag 308, any data received by a device 306, etc. The relationship can provide a guarantee that ensures reliability throughout the system 300. For instance, the relationship can be a transaction, wherein such transaction initiates upon receipt of the tag read, event, tag read event, read, transmission, and/or reception and terminates upon completion of all subscribing processes to such data. The distribute component 302 can allow devices to participate in a transaction, wherein multiple components (which participate in the same transaction) can handle the tag. Therefore, the distribute component 302 provides reliable messaging of tag and/or data from the device 306 to the sink and/or event handler (e.g. associated with the RFID process 304) to ensure that every tag and/or data is accounted for. It is to be appreciated that the distribute component 302, RFID process 304, the device 306, the tag 308, and the interface 106 can be substantially similar to components, processes, devices, tags, and interfaces described previously.

In one example, the distribute component 302 can create a reliable transaction with the data from the receipt into a host associated with the RFID process 304 to the utilization by the RFID process 304 (e.g., a sink, an event handler, etc.). The following can be involved in getting a tag from the device 306 to the sink and/or event handler (e.g. an event handler can be managed code running in the context of the RFID process that processes a tag event) within the RFID process 304: 1) reading the tag 308 at the device 306; 2) transporting the tag 308 to the RFID server (not shown); 3) depositing the tag in a persistent queue for each subscribing RFID process 304; and 4) picking up the tag from the persistent queue and passing it through all the event handlers one of which can be the sink.

The distribute component 302 makes the above part of the same transaction to enable reliable messaging for the tag 308 all the way from the device 306 to the RFID process (e.g., including a sink, event handler, etc.).

For instance, the distribute component 302 can initiate the transaction with a provider upon the reading of the tag 308. The provider can employ communications to an RFID network (not shown). In particular, the provider can be implemented by independent hardware vendor, wherein the provider can be loaded within a host to allow communication with the device 306. If the transaction is started the moment the provider reads a tag and passes that transaction along with the tag 308 to a server, the server would honor that transaction and would enlist the same transaction for depositing and picking up of the tag 308. This can provide reliable messaging of the tag event all the way from the edge device to the tag sink.

The distribute component 302 can include a rollback component 310 that allows rolling the RFID process 304 back to utilize data when an error and/or interruption occurs. An error and/or interruption can be, but is not limited to, a power outage, a reboot, an error, a corruption, a crash, a manual restart, a bug, a regression bug, etc. The rollback component 310 can allow the RFID process 304 to pick up where it left off in the case of the RFID process 304 having an error and/or an interruption. When an error and/or interruption occurs, the execution of the data by RFID process 304 can be incomplete. Yet, the RFID process 304 can be placed back to a point before the error and/or interruption occurred. Since the data (e.g., a read, an event, a tag read, a tag read event, etc.) participates in a transaction, it can be held onto until each and every subscribing process utilizes such data. The rollback component 310 can invoke any suitable rollback technique in relation to the RFID process 304 such that the RFID process 304 can utilize any and/or all data to which it subscribes to receive. It is to be appreciated that the rollback component 310 can be a manual rollback (e.g., by a user that picks a point in time to revert to), an automatic rollback, and/or any combination thereof.

The distribute component 302 can further include a data store 312 that can store tag data participating in a transactional relationship with at least one RFID process 304. The data store 312 can store various data related to the system 300, such as, but not limited to, data received from the device 406, data communicated from the tag 308, a tag read, a tag read event, an event, a read, etc. For instance, the data store 312 can include any data received from the device 306 and/or transmitted from the tag 308, wherein the distribute component 302 can instantiate a transaction to ensure reliable data for implementation in the RFID process 304. The data store 312 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 312 of the subject systems and methods is intended to comprise, without being limited to, these and any other suitable types of memory and/or storage. In addition, it is to be appreciated that the data store 312 can be a server, a database, a queue, a relational database, a hard drive, and the like.

Figure 4:
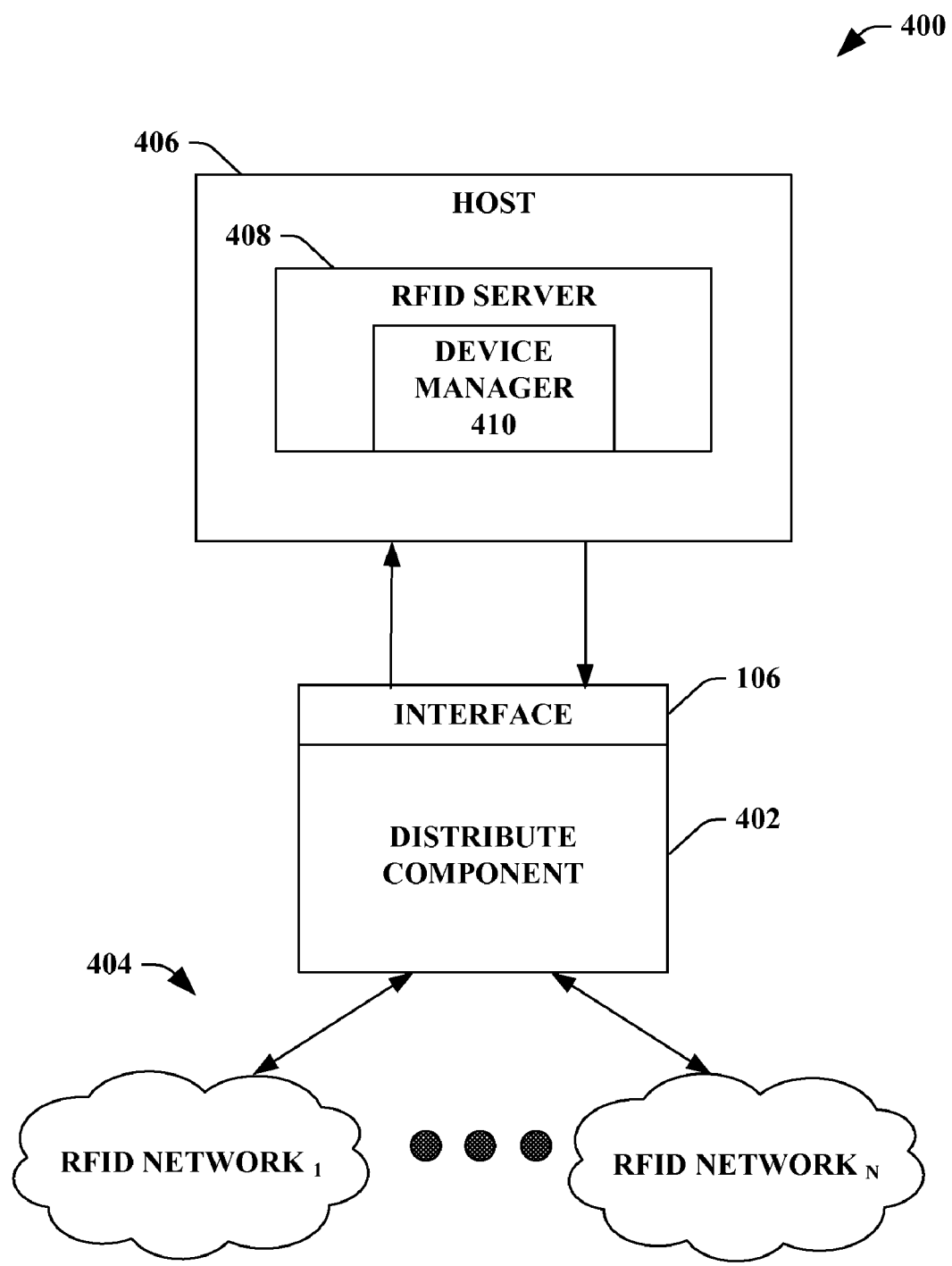
FIG. 4 illustrates a block diagram of an exemplary system that facilitates relying on a tag read from a device utilized by a host.

FIG. 4 illustrates a system 400 that facilitates relying on a tag read from a device utilized by a host. The system 400 can include a distribute component 402 that creates a transaction between an RFID process (not shown) and any data transmitted from a tag within an RFID network 404. It is to be appreciated that a device (not shown) can receive data from the tag and upon such receipt and/or transmission into a host associated with the RFID process, the transaction can be initiated. The transaction can further be held until all processes that require such data have completed any executions with such data. The transactional relationship provides reliable and complete data to be utilized by the RFID process. In other words, the distribute component 402 allows any subscribing RFID process to execute data reliably.

The distribute component 402 can receive data from a plurality of RFID networks 404, wherein each RFID network can be a physical architecture utilizing RFID technology. For example, a first company can deploy an RFID networks within a warehouse, while a second company can deploy a disparate RFID network within a disparate location. There can be any number of RFID networks 404 such as RFID network $_1$ to RFID network $_N$, where N is an integer. Moreover, the RFID networks 404 can include a plurality of devices that can receive data wirelessly from tags. It is to be appreciated that the device within the RFID networks 404 can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system.

In addition, the distribute component 402 can initiate the transaction with data from a tag and a process to ensure reliability with a host 406 that includes an RFID server 408. The RFID server 408 can talk to devices via providers (not shown), wherein the providers can be dynamic-link library (DLL) file that can be written by, for instance, a device independent hardware vendor. By establishing a transaction with the data upon receipt into the host 406, the host 406 and the RFID server 408 can be guaranteed to receive appropriate data and complete data. The RFID server 408 can also include a device manager 410 that can manage the devices within the RFID networks 404.

Figure 5:
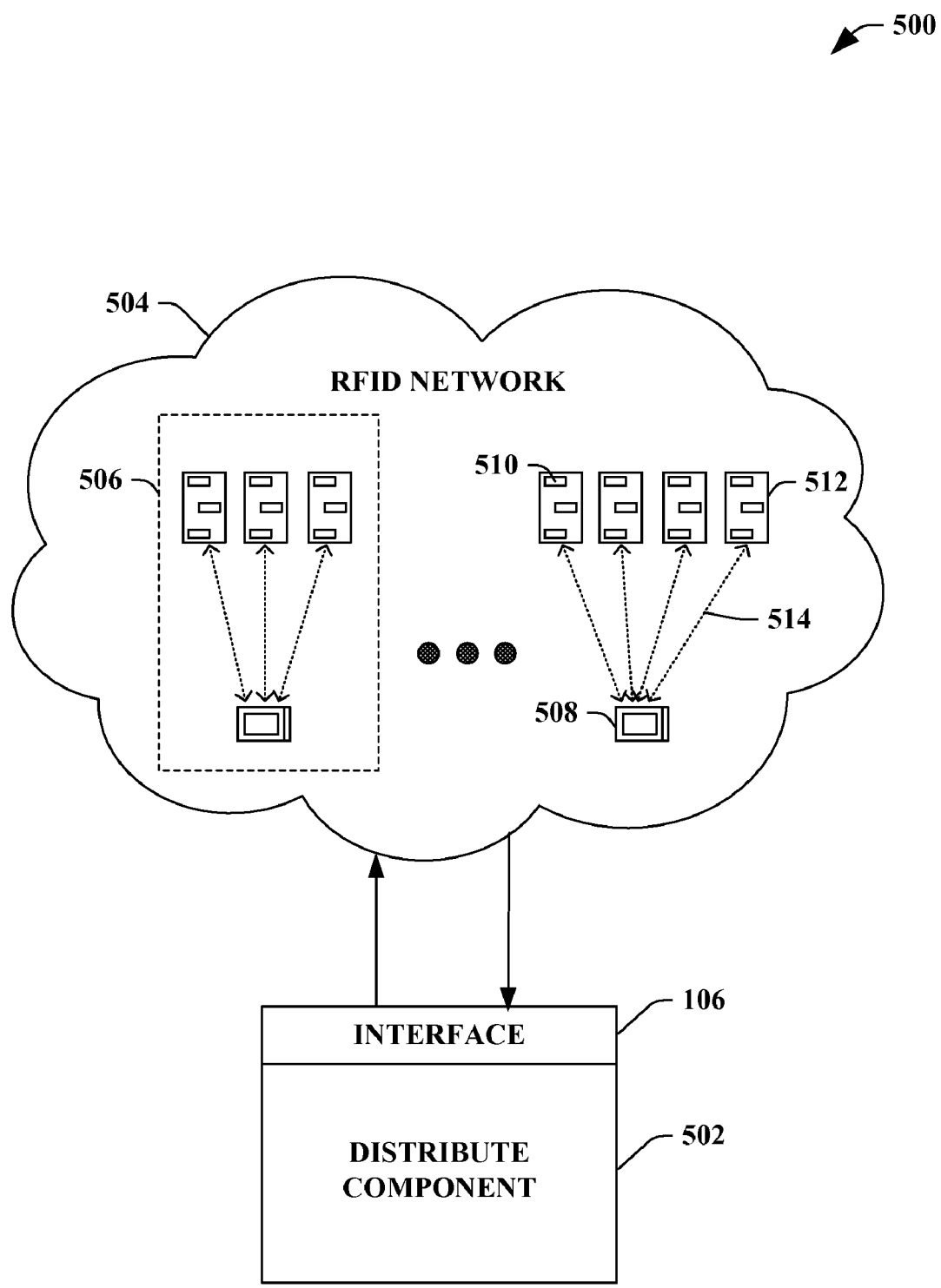
FIG. 5 illustrates a block diagram of an exemplary system that facilitates providing a transaction between data received from a device and a process that is reliable.

FIG. 5 illustrates a system 500 that facilitates providing a transaction between data received from a device and a process that is reliable. The system 500 can include a distribute component 502 that can ensure a reliable transaction between data received via a device 508 and an RFID process (not shown). The distribute component 502 can instantiate a transaction upon the receipt of data (e.g., a read, tag read, an event, a tag read event, etc.) into a host from an RFID network including the device 508 and a tag 510. In other words, the transaction can begin after receipt of a tag read (e.g., after the device sends the tag read to the host). Such transaction can ensure reliability in connection with any suitable process that utilizes such read, tag read, event, tag read event, etc. In other words, any data received by the device 508 can be guaranteed to be utilized by any related process and/or multiple processes. Thus, data received by the device 508 can be stored, utilized by each and every process that requires such, and only then removed and/or deleted. It is to be appreciated that the distribute component 502 can be substantially similar to the distribute component 402, 302, 202, and 102 of FIG. 4, FIG. 3, FIG. 2, and FIG. 1 respectively.

The RFID network 504 can include a plurality of universes (e.g., sub-systems, RFID networks), wherein a universe is a server of RFID entities. For simplicity, the RFID network 504 illustrates a single universe containing two collections of devices (e.g. device collections), where a first collection 506 is shown. It is to be appreciated that the device collections can correspond to device groups, wherein such collections and/or groups can be based on at least one of the following: device physical location, device functionality, device security level, process device association, make and/or model of device, type of device, device frequency, etc. For instance, an RFID sub-system can be a location wherein the entities involved are related to a substantially similar process. In one example, a sub-system can be a warehouse containing a plurality of receiving and/or shipping dock doors with associated devices. Thus, first collection 506 can be a collection of devices within the specified sub-system. It is to be appreciated a plurality of collection of devices can be implemented. Within a collection of devices, a device 508 can receive an RFID signal 514 from a pallet of goods 512 containing at least one RFID tag 510. It is to be appreciated the pallets and/or goods can be tagged based at least upon user specifications (e.g. single pallets tagged, individual goods tagged, pallets and goods tagged, etc.).

Figure 6:
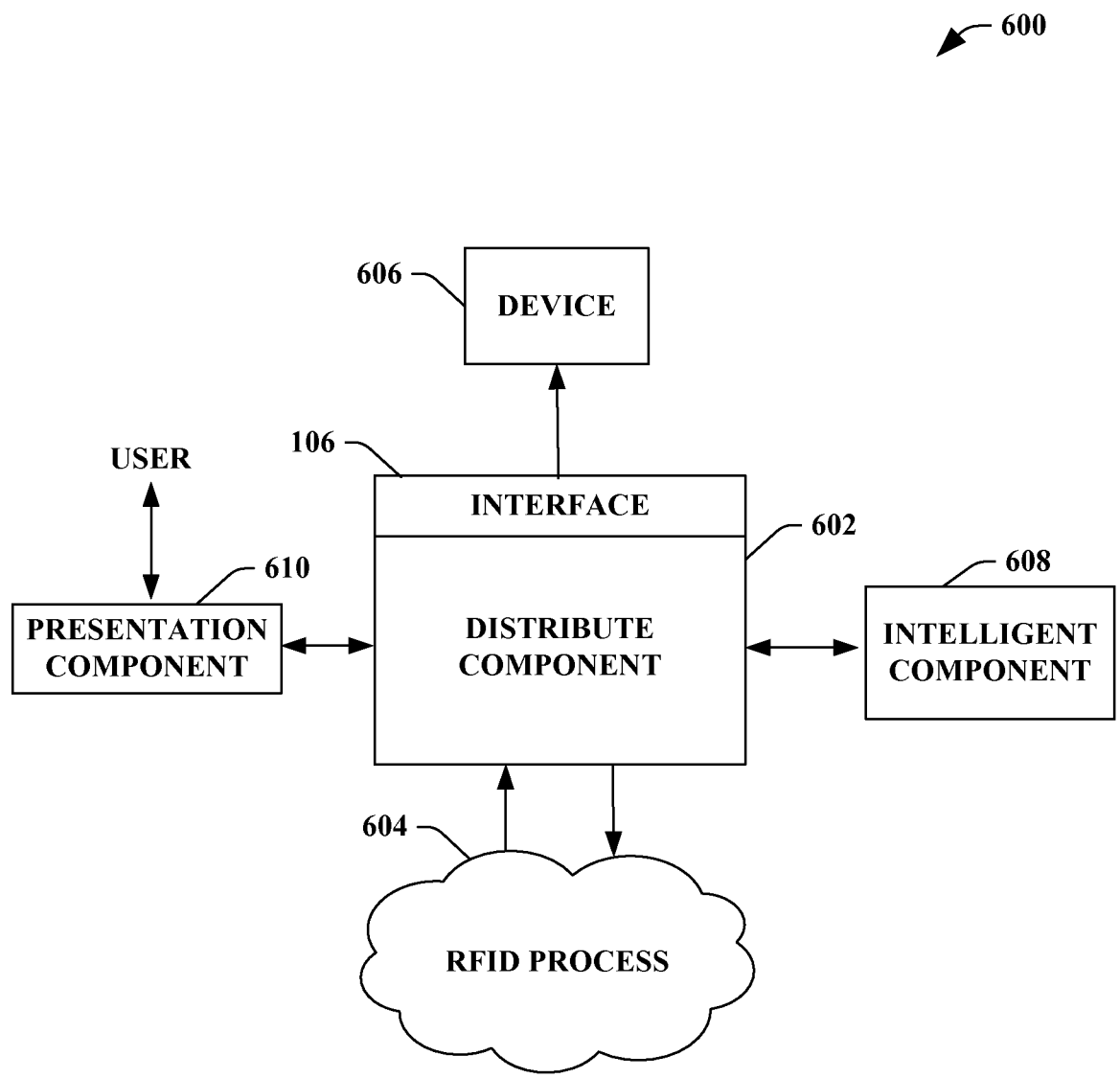
FIG. 6 illustrates a block diagram of an exemplary system that facilitates guaranteeing reliability of a tag read utilized in an RFID process.

FIG. 6 illustrates a system 600 that employs intelligence to facilitate guaranteeing reliability of a tag read utilized in an RFID process. The system 600 can include a distribute component 602, an RFID process 604, a device 606, and the interface 106 that can all be substantially similar to respective components, networks, processes, and interfaces described in previous figures. The system 600 further includes an intelligent component 608. The intelligent component 608 can be utilized by the distribute component 602 to facilitate instantiating a transaction to ensure reliability for data received in relation to the device 606 and a tag (not shown). For example, the intelligent component 608 can infer transaction duration, process association to data, error detection, rollback settings, rollback execution, removal of received data, usernames, passwords, device authentication, etc.

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The distribute component 602 can further utilize a presentation component 610 that provides various types of user interfaces to facilitate interaction between a user and any component coupled to the distribute component 602. As depicted, the presentation component 610 is a separate entity that can be utilized with the distribute component 602. However, it is to be appreciated that the presentation component 610 and/or similar view components can be incorporated into the distribute component 602 and/or a stand-alone unit. The presentation component 610 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the distribute component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
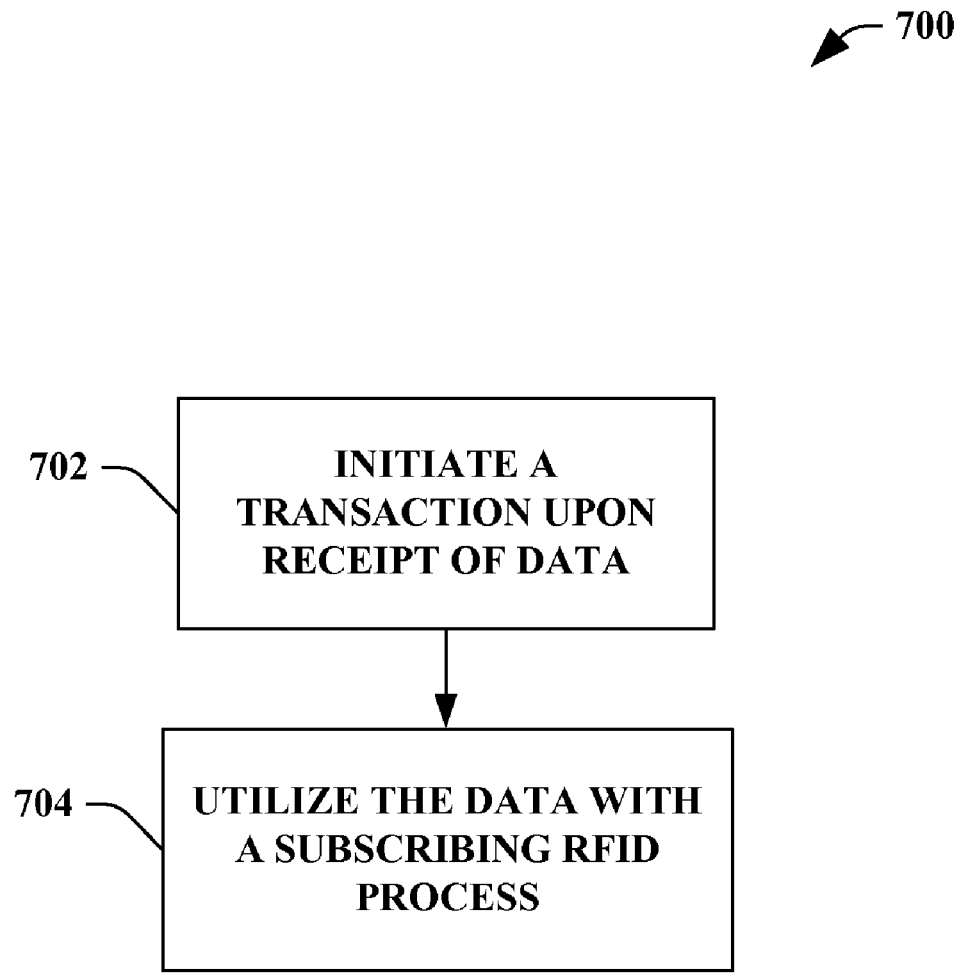
FIG. 7 illustrates an exemplary methodology for participating in a transaction related to data received via a device.
Figure 8:
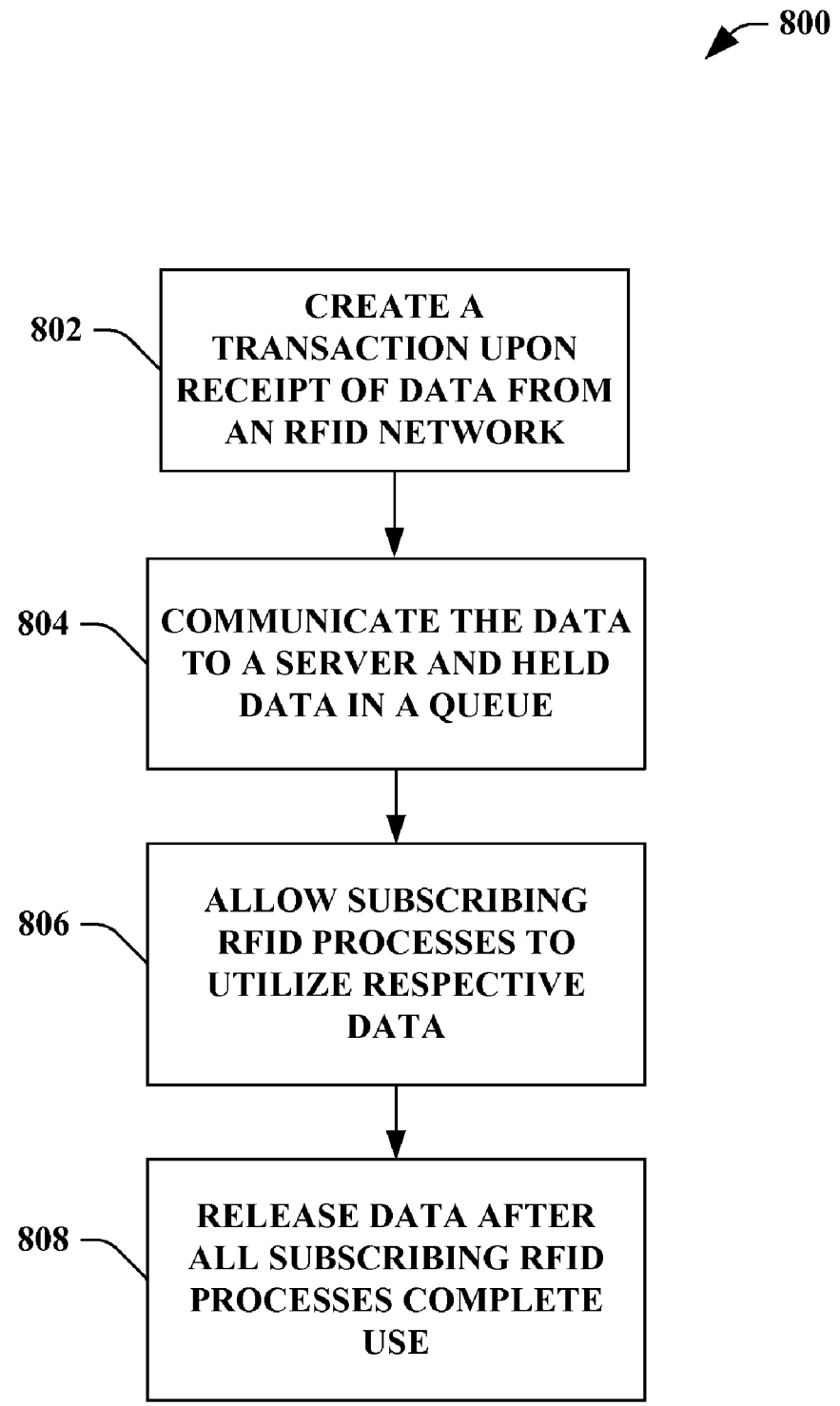
FIG. 8 illustrates an exemplary methodology that facilitates reducing data loss in relation to a device receiving tag data.
Figure 9:
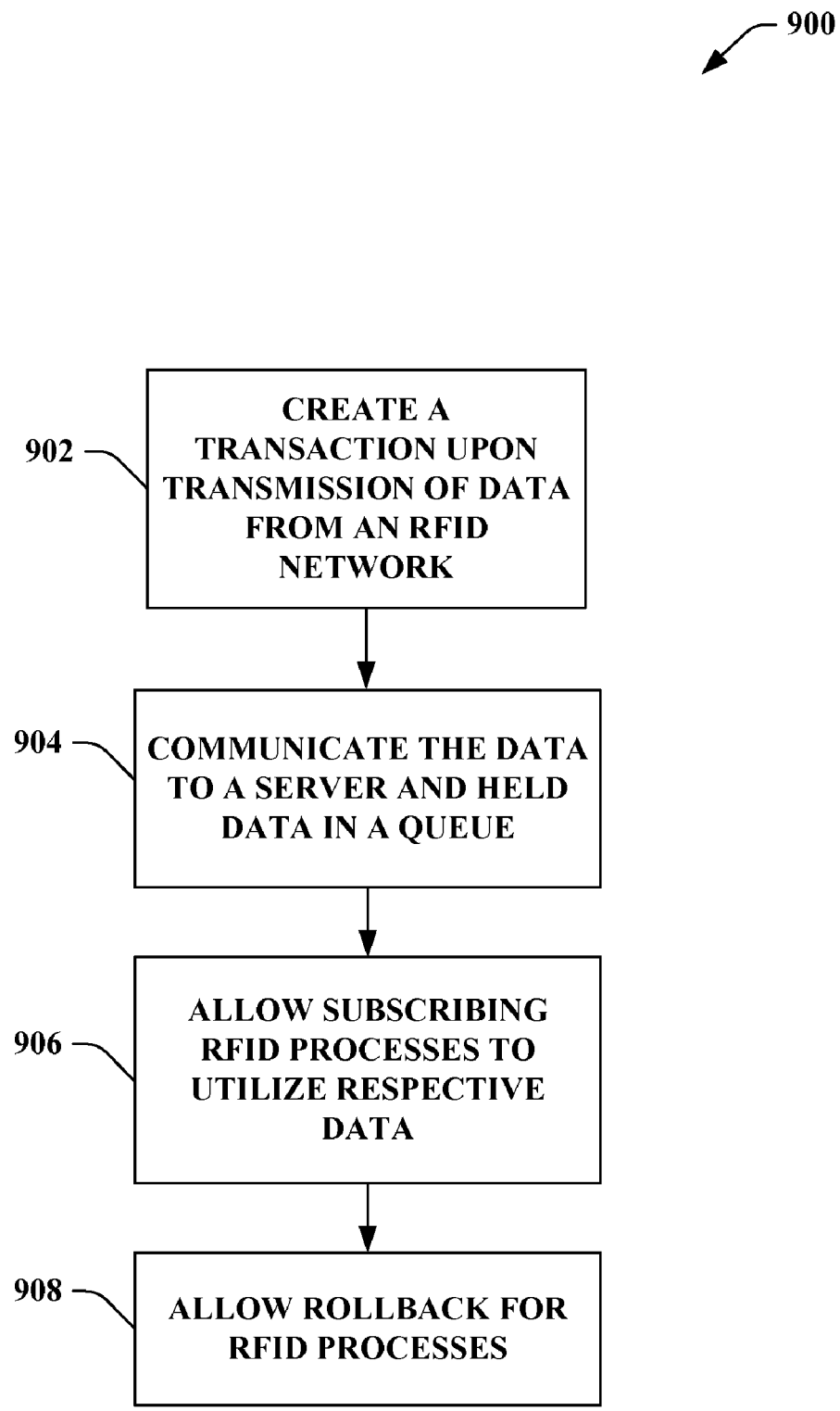
FIG. 9 illustrates an exemplary methodology that facilitates guaranteeing reliability of a tag read utilized in an RFID process.

FIGS. 7-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 that facilitates participating in a transaction related to data received via a device. At reference numeral 702, a transaction can be initiated upon the receipt of data, and in particular receipt of data into a host associated with an RFID process. For instance, the data can be related to a device and a tag, a tag read, a tag, a read, an event, a tag read event, etc. The data can be received by a device, wherein the device can be a an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. By initiating the transaction with the data upon receipt into a host, the data can be guaranteed to be reliable for implementation on various components (e.g., event handlers, sinks, etc.), hosts, servers, managers, RFID processes, etc.

At reference numeral 704, the data can be utilized with a subscribing RFID process. A subscribing RFID process can be a process that can execute with the data. Since the data is associated with the transaction upon receipt, the RFID process can utilize such data reliably. Moreover, any data the RFID process needs will be picked up based on the transaction before release, deletion, removal, etc. For instance, if a process subscribes to receive data from a shipping door device, a transaction can initiate upon receipt of data. The data can then be utilized by the RFID process and will not be extinguished until the process is done with the data and/or each and every process subscribing thereto is done with the data.

FIG. 8 illustrates a methodology 800 that facilitates reducing data loss in relation to a device receiving tag data. At reference numeral 802, a transaction can be created upon receipt of data to a host, wherein the data relates to at least one device within an RFID network. The device can receive a signal from, for instance, at least one tag and/or a plurality of tags. In one example, the tag can contain an antenna that provides reception and/or transmission to radio frequency queries from the device. Furthermore, it is to be appreciated that the device within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system.

The RFID network can include at least one device that is associated with at least one RFID process. It is to be appreciated that the RFID process can utilize any suitable number of devices within the RFID network. An RFID process can be related to a particular RFID sub-system (e.g., an RFID server, RFID network, etc.) that is an uber or high-level object that forms together various entities to create a meaningful unit of execution. The RFID process can be an outbound process (e.g. pick, pack, shipping scenario, etc.), a manufacturing process, a shipping process, a receiving process, tracking, data representation, data manipulation, data application, security, etc.

At reference numeral 804, the data can be communicated to a server and held in a queue. Since the transaction had initiated upon transmission of the data, the server can honor the transaction and hold the data in a queue, database, data store, hard drive, computer, server, and the like. At reference numeral 806, the subscribing RFID processes can pick up and/or utilize the data associated therewith. Thus, any process that requires particular data can pick up the data from the queue to utilize. At reference numeral 808, the data can be released, removed, deleted, etc. after all subscribing RFID processes are done picking up, utilizing, and/or executing the data.

FIG. 9 illustrates a methodology 900 for guaranteeing reliability of a tag read utilized in an RFID process. At reference numeral 902, a transaction can be created upon transmission of data related to a tag from an RFID network to a host. It is to be appreciated that the data can be communicated from a tag to a device that can be at least one of the following: an RFID reader, an RFID writer, an RFID printer, a printer, a reader, a writer, an RFID transmitter, an antenna, a sensor, a real-time device, an RFID receiver, a real-time sensor, a device extensible to a web service, a real-time event generation, etc. The RFID network can be implemented by any enterprise, business, facility, and/or any suitable entity that can utilize RFID technology. For instance, the RFID network can be deployed to include any number of devices such as device $_1$ to device $_N$, where N is positive integer. Moreover, such devices can interact (e.g., wirelessly communicate) with any number of tags such as tag $_1$ to tag $_M$, where M is a positive integer.

At reference numeral 904, the data can be communicated to a server and held in a queue. Continuing at reference numeral 906, subscribing RFID processes can pick up, utilize, and/or execute such data. Based upon the initiated transaction, the data can be reliable and ensured. The transaction allows the data to be utilized since it will not be removed and/or released from the queue until each and every subscribing process picks such data up.

At reference numeral 908, rollback is enabled for at least on RFID process when an error and/or interruption occurs. An error and/or interruption can be, but is not limited to, a power outage, a reboot, an error, a corruption, a crash, a manual restart, a bug, a regression bug, etc. The rollback can allow the RFID process to pick up where it left off in the case of the RFID process having an error and/or an interruption. When an error and/or interruption occurs, the execution of the data by RFID process can be incomplete. Yet, the RFID process can be placed back to a point before the error and/or interruption occurred.

Figure 10:
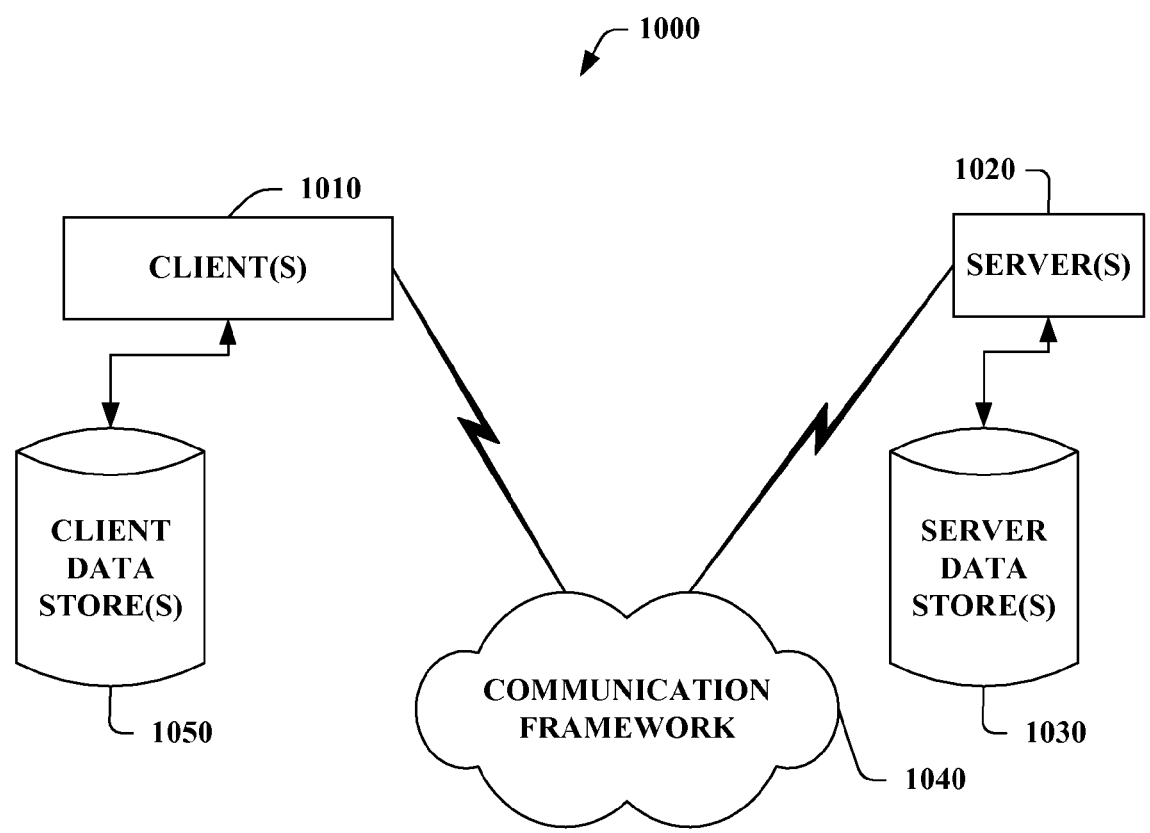
FIG. 10 illustrates an exemplary networking environment, wherein the novel aspects of the claimed subject matter can be employed.
Figure 11:
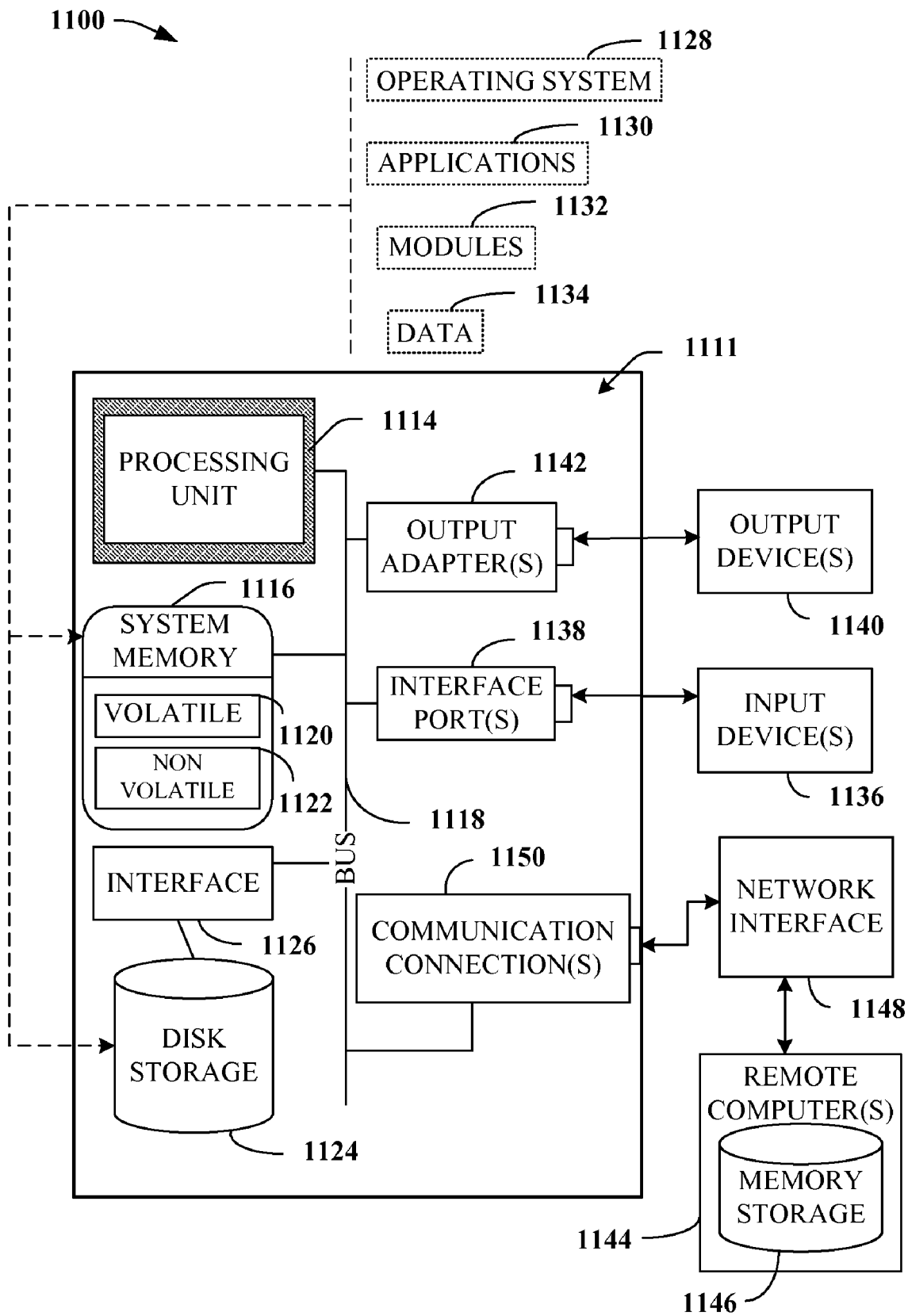
FIG. 11 illustrates an exemplary operating environment that can be employed in accordance with the claimed subject matter.

In order to provide additional context for implementing various aspects of the claimed subject matter, FIGS. 10-11 and the following discussion is intended to provide a brief, general description of a suitable computing environment in which the various aspects of the subject innovation may be implemented. For example, a distribute component that provides a reliable transaction for data received from a device, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for ensuring reliable data within a radio frequency identification (RFID) infrastructure, comprising:
    a radio frequency identification (RFID) network that includes at least one device for receiving data from a tag;
    a persistent queue configured to store the data;
    a distribute component configured to initiate and execute to completion a reliable transaction with the received data to ensure at least one subscribing RFID process utilizes such data, at least in part by performing operations to create a transaction associated with the data,
        relate the transaction to a plurality of RFID processes supported by a host, each of the plurality of RFID processes subscribing to at least a portion of the data and, and
        maintain the data in the persistent queue until each of the plurality of RFID processes has utilized a respective portion of the data; and
    a rollback component configured to provide at least one checkpoint for resumption of an interrupted RFID process;
    wherein at least one of the plurality RFID processes comprises a write process configured to write to a tag process, and to check if the write succeeded by reading and passing data to the host.

2. The system of claim 1, wherein at least one of the plurality of RFID processes relates to at least one of the following: an outbound process; a manufacturing process; a shipping process; a receiving process; a tracking process; a data representation process; a data manipulation process; a security process; or a process utilizing at least one of an RFID device service, a device collection, a tag read, an event, an event queue, a tag write, a device configuration, or a number count.

3. The system of claim 1, wherein the at least one device includes at least one of the following: an RFID reader; an RFID writer; an RFID printer; a reader; a writer; an RFID transmitter; an antenna; a sensor; a real-time device; an RFID receiver; a real-time sensor; a device extensible to a web service; or a real-time event generation system.

4. The system of claim 1, wherein the received data includes at least one of the following: a read from the tag, a tag event, a tag read event, data received by the device, or data transmitted from the tag.

5. The system of claim 1, wherein the transaction is to be initiated upon transmission of the data from the tag.

6. The system of claim 1, further comprising an event handler associated with at least one of the plurality of RFID processes.

7. The system of claim 6, wherein the event handler includes managed code for executing in a context of the at least one of the plurality of RFID processes.

8. The system of claim 1, further comprising a sink associated with at least one of the plurality of RFID processes.

9. The system of claim 1, wherein an interruption associated with the interrupted RFID process includes at least one of a power outage, a reboot, an error, a corruption, a crash, a manual restart, a bug, or a regression bug.

10. The system of claim 1, wherein a rollback associated with the rollback component includes at least one of a manual rollback or an automatic rollback.

11. The system of claim 1, wherein the distribute component is further configured to include in the transaction the operations of transporting the data to an RFID server, depositing the data in the persistent queue for each subscribing RFID process, and passing the data through a plurality of event handlers.

12. The system of claim 1, wherein the data is to be released from the persistent queue if a completion of a subscribing RFID process picking up the data is confirmed.

13. The system of claim 1, wherein the RFID network comprises at least one of: an RFID reader for receiving an RFID signal; or an RFID tag for transmitting to at least one device.

14. The system of claim 1, further comprising a presentation component for facilitating interaction with the distribute component.

15. The system of claim 1, wherein the distribute component is configured to provide atomicity, consistency, isolation, and durability for a lifetime of the data in relation to a subscribing RFID process.

* * * * *